United States Patent [19]

Kloster

[11] 4,431,092
[45] Feb. 14, 1984

[54] RETAINING DEVICE FOR A SHOCK ABSORBER ASSEMBLY

[76] Inventor: Kenneth D. Kloster, 6649 Mill Ridge Rd., Maumee, Ohio 43537

[21] Appl. No.: 286,984

[22] Filed: Jul. 27, 1981

[51] Int. Cl.³ .............................................. F16F 9/32
[52] U.S. Cl. ........................... 188/321.11; 29/402.08; 188/322.19; 403/288; 403/342
[58] Field of Search ................... 280/668; 188/321.11, 188/322.19, 322.21, 322.22; 267/8 R, 64.15; 285/322; 403/342, 290, 288; 411/280, 291; 29/402.08, 402.06, 402.07, 402.05, 402.04, 227

[56] References Cited

U.S. PATENT DOCUMENTS

| | | | |
|---|---|---|---|
| 2,564,019 | 8/1951 | Martin, Jr. | 403/290 X |
| 2,624,592 | 1/1953 | MacPherson | 267/8 R X |
| 3,346,272 | 10/1967 | Smith | 280/668 |
| 4,034,960 | 7/1977 | Kloster | 29/227 X |
| 4,145,075 | 3/1979 | Holzmann | 285/322 X |
| 4,261,446 | 4/1981 | Bolger | 188/321.11 X |
| 4,280,602 | 7/1981 | Kloster | 188/322.19 |
| 4,290,511 | 9/1981 | DeBaan et al. | 188/321.11 |

*Primary Examiner*—Douglas C. Butler
*Attorney, Agent, or Firm*—Wilson, Fraser, Barker & Clemens

[57] ABSTRACT

This invention relates to a retaining sleeve which is utilized in conjunction with an associated threaded cap to hold a replacement shock absorber within the cylindrical shroud of a vehicular suspension system of the type commonly referred to as a MacPherson strut suspension system. The retaining sleeve includes a hollow cylindrical upper member and a hollow cylindrical lower member. The lower end of the upper member is provided with collet portion having a plurality of radially movable arms. The collet portion has external tapered formed thereon for engagement with internal tapered threads formed on the upper end of the lower member. The relative rotation between the upper and lower members in one direction causes the collet arms to move radially inwardly to securely grip the outer wall of the cylindrical shroud. After a replacement shock absorber is inserted within the cylindrical shroud, the threaded cap can be secured to the upper end of the retaining sleeve.

2 Claims, 4 Drawing Figures

RETAINING DEVICE FOR A SHOCK ABSORBER ASSEMBLY

CROSS REFERENCE TO RELATED APPLICATION

This application is related in subject matter to my pending U.S. application Ser. No. 086,786 filed Oct. 22, 1979 now U.S. Pat. No. 4,280,602, issued July 28, 1981.

BACKGROUND OF THE INVENTION

One type of vehicular suspension system which is becoming increasingly popular is the MacPherson strut suspension system. The MacPherson strut is an integral, coil spring-shock absorber assembly which provides a lightweight, compact vehicle suspension system. The MacPherson strut suspension system is disclosed in more detail in U.S. Pat. No. 2,624,592 to E. S. MacPherson.

One of the problems associated with MacPherson strut assemblies is that the shock absorber unit typically wears out before the associated coil spring. One solution to this problem is to manufacture the MacPherson strut assembly with a construction which permits a shock absorber to be readily removed and replaced with a new shock absorber. However, this type of construction results in additional manufacturing expense. Consequently, some manufacturers produce MacPherson strut assemblies which do not readily accept replacement shock absorbers. In this type of assembly, the original equipment shock absorber unit is inserted into an associated cylindrical shroud which is subsequently sealed by welding or roll forming operations. The cylindrical shroud typically includes a coil spring support and a lower support bracket. Thus, when the shock absorber unit wears out, the vehicle owner is faced with the expense of replacing the entire cylindrical shroud assembly, including the coil spring and the lower support bracket.

SUMMARY OF THE INVENTION

The present invention relates to a retaining sleeve which is utilized in conjunction with an associated threaded cap to hold a replacement shock absorber within the cylindrical shroud of a MacPherson strut suspension system. If the original shock absorber has been sealed within the cylindrical shroud, the upper end of the shroud must be severed to provide access to the original shock absorber. After the upper end of the shroud has been severed, the worn shock absorber is readily accessible and may be removed and replaced with a new shock absorber. The retaining sleeve of the present invention can then be secured to the upper end of the cylindrical shroud to receiving the associated threaded cap. Another type of retaining sleeve which can do also be utilized is disclosed in my pending U.S. patent application Ser. No. 086,786 filed Oct. 22, 1979.

The retaining sleeve according to the present invention includes a hollow cylindrical upper member and a hollow cylindrical lower member, with a threaded portion formed adjacent the upper end of the upper member. In one embodiment of the present invention, the lower member of the main body is provided with jaw means such as a collet portion having a plurality of radially inwardly movable arms on the upper end thereof. The collet portion also includes an externally tapered threaded section formed thereon. The lower end of the upper member is provided with an internally threaded tapered section for engagement with the externally threaded tapered section of the lower member.

The upper and lower members have inner annular walls of a predetermined diameter corresponding to the outer diameter of the cylindrical shroud. However, as the upper and lower members are rotated in one direction relative to one another, the arms of the collet portion of the lower member are forced inwardly to engage the outer wall of the cylindrical shroud and provide tight frictional engagement with the outer wall of the shroud.

In an alternate embodiment of the present invention, the upper member is provided with a collet portion and an externally threaded tapered portion on the lower end thereof, while the lower member is provided with an internally threaded tapered portion on the upper end thereof for engagement with the external tapered threads of the upper member.

DESCRIPTION OF THE PREFERRED EMBODIMENTS

Figure 1:
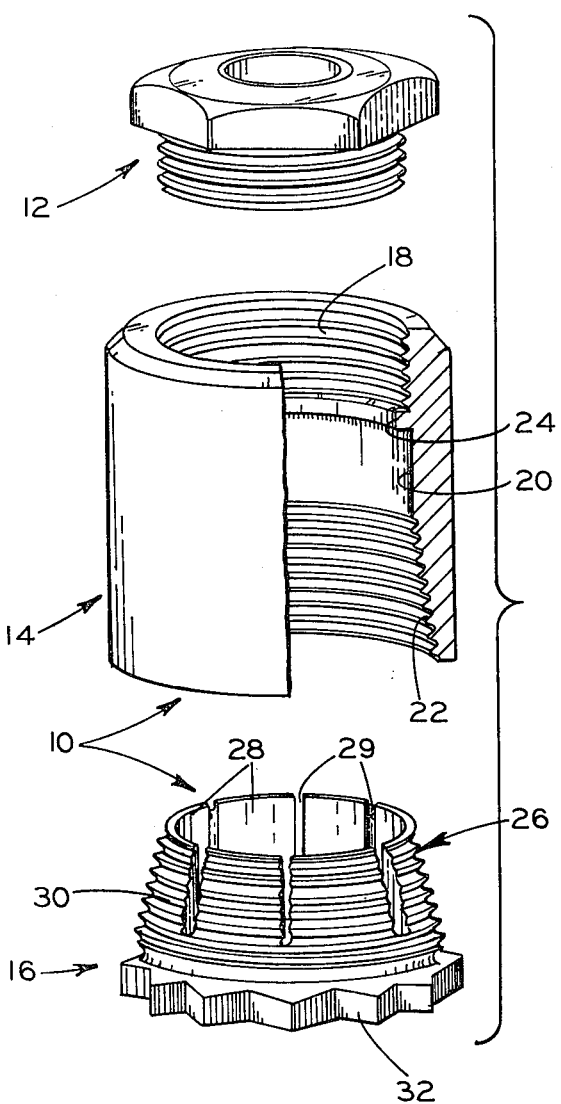
FIG. 1 is an exploded perspective view of a retaining sleeve embodying the features of the present invention along with an associated threaded cap to be utilized in conjunction therewith.
Figure 2:
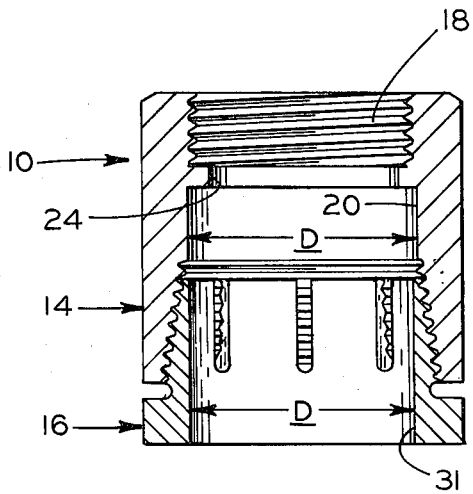
FIG. 2 is a sectional view of the retaining sleeve of FIG. 1.

Referring to FIGS. 1 and 2, there is shown a retaining sleeve 10 embodying the features of the present invention. The retaining sleeve 10 is utilized in conjunction with an associated threaded cap 12 to hold a replacement shock absorber within the cylindrical shroud of a MacPherson strut suspension system.

The retaining sleeve 10 includes a hollow cylindrical upper member 14 and a hollow cylindrical lower member 16. The upper member 14 has an upper internal threaded portion 18, an inner annular wall 20 having a diameter D as indicated in FIG. 2, and an internal tapered threaded portion 22. An inwardly extending radial lip 24 is formed intermediate the upper threaded portion 18 and the inner annular wall 20.

The lower member 16 includes jaw means such as a collet portion 26 having a plurality of spaced apart, upwardly extending arms 28 separated by elongate slots 29. The collet portion 26 has an external threaded portion 30 formed thereon for engagement with the internal tapered threaded portion 22 of the upper member 14. The lower end of the lower body 16 includes an inner annular wall 31 having a diameter D and a tool engaging configuration 32 for engagement with a suitable tool (not shown) for securing the retaining sleeve to the cylindrical shroud.

Figure 3:
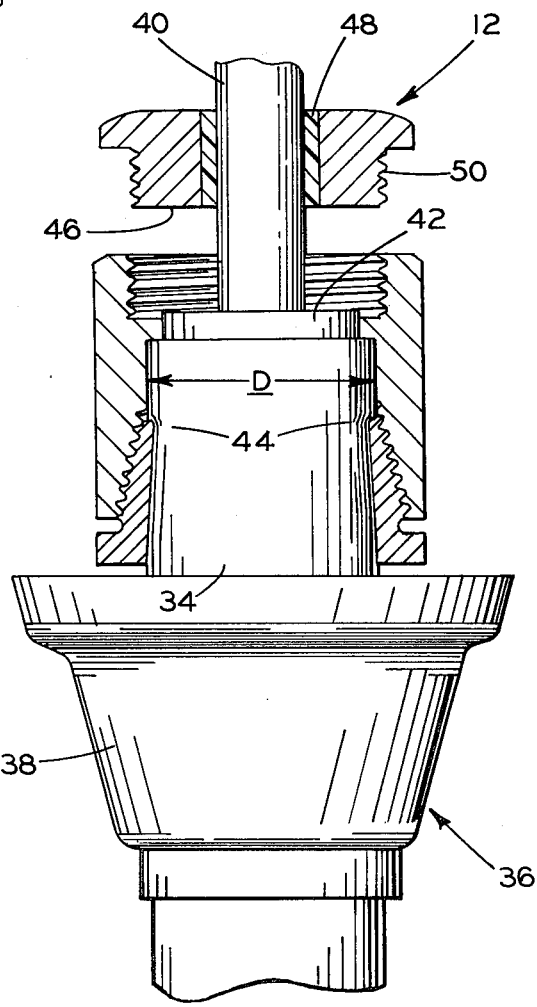
FIG. 3 is a view, similar to FIG. 2, but showing the retaining sleeve secured to the upper end of a cylindrical shroud of a MacPherson strut suspension system and in position to receive the associated threaded cap.

FIG. 3 illustrates the operation of the retaining sleeve 10 when it has been secured to a cylindrical shroud 34 of a MacPherson strut assembly, generally indicated by reference numeral 36. The MacPherson strut 36 shown in FIG. 3 has been partially disassembled by removing a coil spring (not shown) which was supported by a coil spring support 38 welded to the cylindrical shroud 34. A tool which can be utilized to remove the coil spring is disclosed in U.S. Pat. No. 4,034,960 to K. D. Kloster. A piston rod 40 of a replacement shock absorber 42 extends axially from one end of the shock absorber 42.

Before the replacement shock absorber can be placed within the shroud 34, the original worn shock absorber must be removed therefrom. In instances where the original shock absorber has been sealed within the shroud by welding or roll forming operations, the upper end of the shroud must be severed to provide access to the original shock absorber. A tool which can be utilized to sever the upper end of the shroud is disclosed in U.S. patent application Ser. No. 086,784, filed Oct. 22, 1979. After the upper end of the shroud is severed, the worn shock absorber can be removed and replaced with the new shock absorber.

After the replacement shock absorber is inserted into the shroud 34, the upper and lower members of the retaining sleeve 10 are placed on the upper end of the shroud such that the upper edge of the shroud abuts against the radial lip 24 of the upper member 14. The upper member 14 is then held in position as a suitable tool (not shown) is utilized to thread the lower member 16 into the upper member. Although not shown in the drawings, it may be desirous to also provide the outer surface of the upper member 14 with a tool engaging configuration to assist the operator in maintaining the member 14 in position. As the lower member 16 is further rotated, the internal tapered threads 22 of the upper portion 14 causes the upwardly extending arms 28 of the collet portion 26 to be forced radially inwardly and partially collapse the outer wall of the shroud 34, as indicated by reference numeral 44. This results in the retaining sleeve 10 being securely fixed to the upper end of the shroud 34.

The inner diameter of the annular wall 20 is substantially equal to the outer diameter of the cylindrical shroud 34 to insure that the upper threaded portion 18 is properly aligned to receive the threaded cap 12. The cap 12 has a lower surface 46 and a centrally located plastic bushing 48 through which the piston rod 40 is inserted. The cap 12 also has external threads 50 formed thereon for engagement with the threaded portion 18 of the sleeve 10. When the cap 12 is fully threaded onto the sleeve 10, the top edge of the replacement shock absorber 42 abuts the lower surface 46 of the cap 12.

Figure 4:
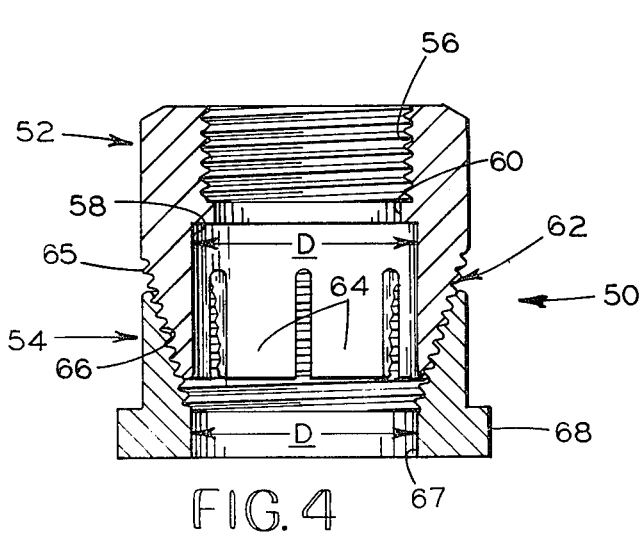
FIG. 4 is a sectional view illustrating an alternate embodiment of the retaining sleeve embodying the features of the present invention.

Referring to FIG. 4, there is shown a retaining sleeve 50 which is an alternate embodiment of the sleeve 10 shown in FIGS. 1 through 3. The sleeve 50 includes an upper member 52 and a lower member 54. Basically, the retaining sleeve 50 is similar to the retaining sleeve 10 of FIG. 1 except that, in the retaining sleeve 50, the collet portion having external tapered threads is formed on the lower end of the upper member, while the internal tapered threads are formed in the upper end of the lower member.

The upper member 52 includes an upper internal threaded portion 56 formed therein for receiving an associated threaded cap. The upper portion 52 further includes an inner annular wall 58 having a diameter D and an inwardly projecting radial lip 60 formed intermediate the threaded portion 56 and the inner wall 58. The lower end of the upper member 52 includes a collet portion 62 having a plurality of downwardly extending arms 64. The collet portion 62 has an external tapered threaded portion 65 formed thereon.

The lower member 54 is provided with an internal tapered threaded portion 66 which cooperates with the external tapered threads 65 on the upper member 52 to move the collet arms 64 inwardly when it is desired to secure the retaining sleeve 50 to the upper end of a cylindrical shroud. The lower member 54 includes an inner annular wall 67 having a diameter D and an outer tool engaging configuration 68 to assist an operator in securing the device to a cylindrical shroud.

In summary, the present invention concerns a retaining sleeve have a hollow cylindrical upper member and a hollow cylindrical lower member. The upper member has a threaded portion formed adjacent the upper end thereof for receiving an associated threaded cap. The upper member also has a threaded portion adapted to threadably engage a cooperating threaded portion of the lower member. One of the members is provided with jaw means such as a collet portion having a plurality of radially movable arms. While the threaded engagement between the upper and lower members is shown in the drawings as a pair of cooperating tapered threaded portions, it is not necessary that both threaded portions be tapered. For example, in FIG. 3, the external threaded portion 30 could be formed with threads having a uniform diameter, while the internal threaded portion could be tapered. This arrangement would provide a suitable means for moving the collet arms radially inwardly.

It should be noted that, in some instances, it may be desirous to incorporate the retaining sleeve and the associated retaining cap into a single unit. In this type of unit, a top wall (not shown) is attached to the upper end of the upper member 14 and includes an aperture formed therein for receiving the piston rod of the shock absorber assembly. This type of construction eliminates the need of having internal or external threads formed around the upper end of the upper member.

It should also be noted that, in some instances, it may be desirous to provide external threads on the upper end of the upper member 14 instead of the internal threads as shown in the drawings. In these instances, the retaining cap is formed with cooperating internal threads.

In accordance with the provisions of the patent statutes, the principle and mode of the invention have been explained and illustrated in what is considered to represent its preferred embodiment. However, it must be understood that the invention can be practiced otherwise than as specifically illustrated and described without departing from its spirit or scope.

What is claimed is:

1. In combination with a cylindrical shroud of a shock absorber assembly having a shock absorber located within said shroud and having a piston rod axially extending from one end of said shroud, retaining means for retaining said shock absorber within said shroud, said retaining means including a threaded cap having a piston rod receiving aperture, first and second hollow cylindrical members adapted to coaxially surround one end of said cylindrical shroud, one end of said first member adapted to threadably receive said threaded cap, the other end of said first member adapted to threadably engage at least an end portion of said second hollow member, and at least one of said hollow cylindrical members having jaw means adapted to be urged inwardly into engagement with said shroud upon the tightening of the threaded engagement between said first and second hollow cylindrical members, said jaw means including a collet portion having a plurality of radially movable arms, the one of said hollow cylindrical members having said jaw means including an externally threaded section, and the other of said members including an internally threaded section for threaded engagement with said externally threaded section of the one member, at least one of said external and internal threaded sections having a tapered portion whereby relative rotation between said members in one direction causes said collet arms to move radially inwardly to securely grip the outer wall of said shroud.

2. An apparatus according to claim 1 including an inwardly extending radial lip formed on the inner wall of said first member for supporting said first member on the one end of said cylindrical shroud.

* * * * *